B. G. CARLSSON.
GAS REGULATOR.
APPLICATION FILED APR. 19, 1921.
1,390,759.
Patented Sept. 13, 1921.
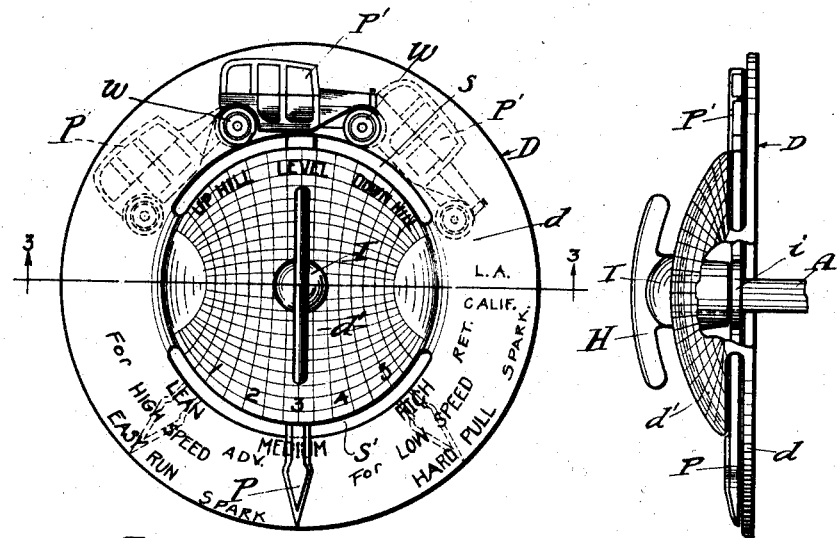
Fig. 1.
Fig. 2.
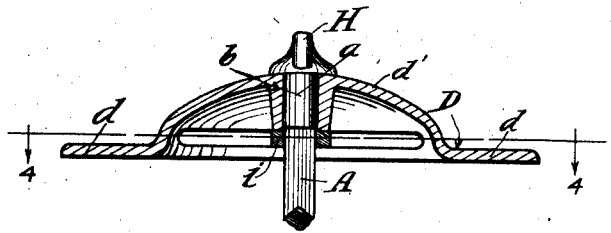
Fig. 3.
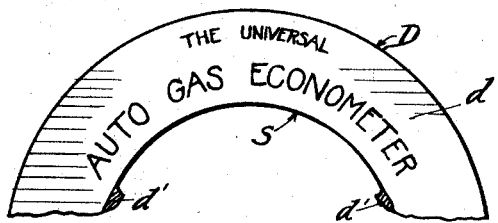
Fig. 4.
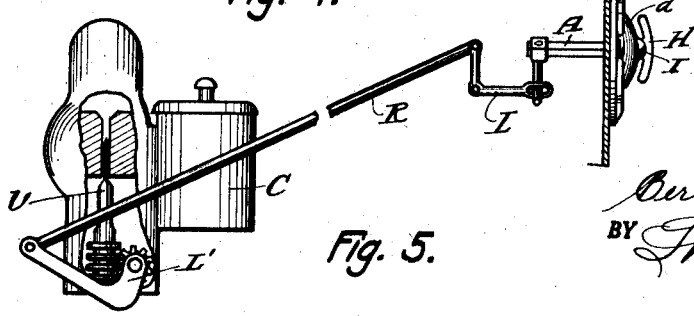
Fig. 5.
INVENTOR.
Bernhard G. Carlsson
BY
ATTORNEYS.

UNITED STATES PATENT OFFICE.

BERNHARD G. CARLSSON, OF LOS ANGELES, CALIFORNIA.

GAS-REGULATOR.

1,390,759.         Specification of Letters Patent.     Patented Sept. 13, 1921.

Application filed April 19, 1921. Serial No. 462,742.

*To all whom it may concern:*

Be it known that I, BERNHARD G. CARLSSON, a citizen of the United States, and a resident of Los Angeles, in the county of Los Angeles and State of California, have invented new and useful Improvements in Gas-Regulators, of which the following is a specification.

This invention relates to, and has for its main object, the provision of an efficient, simple, and compact regulating device, attachable to the instrument board of an automobile for regulating the mixture of fuel supplied to the motor.

It is an object of my invention to provide in a device of the character stated, visible means for indicating on a suitable dial or surface, the character of a mixture required for obtaining the most efficient and economical operation of the motor under different conditions. In other well known forms of fuel regulators, means has been provided for regulating the flow of gasolene from the carbureter, whereby the proportion of gasolene mixed with the air supplied to the motor may be varied by manual operation of a device conveniently positioned with respect to the driver of the automobile. Such devices, however, are generally unsatisfactory, for the reason that the majority of automobile drivers are inexperienced, untechnical, and are not versed in the properties or characteristics of the fuel, and therefore do not properly use or operate the regulating means for obtaining the best, with a minimum consumption of fuel.

In many cases also, because of ignorance of the exact requirements of the motor for obtaining the best results, or for the reason the operator forgets the proper position of the regulator for greatest efficiency, the device is not used at all, or if used, it is improperly operated, causing the above circumstances. I have provided a means for regulating the fuel supply which is adapted to be connected in a suitable manner with the needle valve of the carbureter for regulating the volume of fuel admitted into the intake manifold of the motor, which in combination with said specific dial, of structure and arrangement of parts, whereby the exact requirements of the motor, under varying conditions, may be visibly indicated so that a novice or an inexperienced driver may thoroughly understand the operation of the device, and regulate the same in a proper manner and to a proper extent for obtaining the best results.

With these and other objects in view, which may appear as the description progresses, I have illustrated one practical embodiment of my device, comprising the essential features of my invention and subject to modification within the scope of the appended claims, in the accompanying drawings, in which:

Figure 1 is a face view of my indicating device.

Fig. 2 is a side view of the same.

Fig. 3 is a section of the same, on line 3—3 of Fig. 1.

Fig. 4 is a fragmentary sectional plan of the same, on line 4—4 of Fig. 3.

Fig. 5 is an elevation, showing the operative connection between my device and the carbureter, for carrying out the objects of my invention, as hereinbefore stated.

My device consists primarily, of a dial D and a manually operated indicator I, adapted to be suitably attached to the instrument board B of an automobile. The dial D has an annular flat flange portion $d$, with a semi-spherical central portion $d'$ integrally formed therewith, and having arcuate slots S and S' formed at diametrical points between the dial portion $d$ and central portion $d'$. The indicator I comprises a stem A which has a handle H either formed thereon or suitably attached thereto and provided with a bearing portion $a$, which is rotatably held in a boss $b$ formed on the interior of the central portion $d'$ of the dial. The portion A of the handle stem is preferably squared and is adapted to receive the central portion $i$ of the indicator I.

Said indicator has a pointer P which extends through the slot S' of the dial and is movably disposed over a segment of the portion $d$ of the dial. The opposite end P' is preferably of the form of an automobile and is so positioned that the wheels W, W, of the automobile will touch the outer edge of the sphere or globe on the dial, as shown in Fig. 1.

I have marked the central portion $d'$, which is semi-spherical with meridians and parallels, such as would be found on a globe or sphere, (with the meridians and parallels of the earth marked thereon), and I have provided on the upper periphery of this spherical portion d', adjacent to the lower edge of the slot S the words "Up hill," "Level," and "Down hill."

It is a well known fact that at times, and under certain conditions, the most efficient operation of the motor can be obtained by varying the mixture of the fuel to correspond with the work done by the motor. For instance, frequently by retarding the spark and providing a richer mixture of the fuel on grades, the motor will give more satisfaction, and provide more power for the car. Thus, I have shown on the spherical portion d' of the indicator, the words "Up hill" at the left extremity of the slot S, and as shown in Fig. 1, when the portion P' of the indicator is moved into the position shown in broken lines, toward the left extremity of the slot S and on the radial lines of the words "Up hill" the operator of the car will understand that the movement of the automobile into the position shown in broken lines in Fig. 1, will indicate and regulate the mixture of fuel to the proper extent, and the automobile will be in an inclined position. In such event, when running on the level ground, the portion P' of the indicator will be substantially on a horizontal line and above the word "Level" and when running down hill, the portion P' will be moved to the right over the words "Down hill." The movement of the indicator I is accomplished by means of the handle H. In many cases atmospheric conditions retard the regulation of the mixture, and in order that the fuel supply may be properly regulated, in such event, I have provided, adjacent the top of the lower slot S', a graduating scale of figures, "1, 2, 3, 4, 5," etc., and in some cases, or at the will of the driver of a vehicle, the extent of movement of the indicator I may be best determined by moving the indicator I so that the pointer P will register with certain of the numbers "1, 2, 3, 4, 5," etc.

In addition to the indicia and indicating means described above for regulating the movement of the indicator to correspond to the different requirements of the motor, I may provide on the lower portion of the dial d at the left of the center, the words "Lean," "High speed," "Easy run." In the center of the dial, midway between the extremes of movement of the pointer P, I may provide the word "Medium," and at the right extreme movement of said pointer, I may provide the words, "Rich," "Low speed," "Hard pull." Thus, will be indicated on the dial both graphically and otherwise, to meet all conditions and for the benefit of both experienced and inexperienced operators of vehicles, just what should be the character of the mixture of fuel for all conditions and requirements of the motor.

It is a fact also, especially on Ford automobiles, that an adjustment of the spark lever is necessary, or desirable, for obtaining the best results under different conditions, and circumstances, and I may provide, therefore, on the lower central portion of the dial d of my regulator device, suitable indicia or instructions to the operator for the regulation of the spark lever to correspond with the regulation of the fuel supply.

As shown in Fig. 5 the stem A of the indicator I may be connected with the needle valve V of the carbureter C by means of a bell crank lever L and a rod R connecting said lever with the valve operating lever L' on the carbureter, or otherwise. The specific means of connection between my regulator and the carbureter valve being immaterial, as it will be understood that all carbureters are differently constructed and require different types of connecting mechanism.

According to recent tests made for the purpose of ascertaining the volume of combustible gases discharged through the exhaust from trucks and pleasure automobiles under average working conditions, it has been found that thirty per cent. of the fuel now used by automobiles in the United States is wasted through improper adjustment of the carbureter, thus causing incomplete combustion, and it is with a view to correcting these conditions so far as possible, that I have provided means for accurately adjusting the carbureter to a proper extent, corresponding to the requirements of the motor, and whereby the spark lever of the motor may be correspondingly adjusted for obtaining the most economical consumption of fuel and the best results generally.

In most modern types of automobiles, the mechanism provided for adjusting the carbureter to change the character of the fuel mixture are of such character that it is impossible for an operator to know definitely which way to operate the device for obtaining desired results, and frequently when an operator becomes acquainted with the use of such device, he may forget the exact position to which the carbureter adjusting lever or arrangement should be moved for certain conditions of service.

In my device, herein disclosed it will be noted that I have provided a comprehensive means for clearly denoting the proper position for the carbureter adjusting device under all conditions.

What I claim is:

1. A gas regulator for motor propelled vehicles, including a dial having a semispherical central portion with indicia thereon, for visibly indicating the proper movement of the regulator and a flange surrounding said portion and also having indicia thereon, and an indicator pivotally mounted on said central portion and movable over the face of said dial for registration with said indicia, as described.

2. A gas regulator for motor propelled vehicles, as characterized in claim 1, and including separate indicating portions operable for separately and in different ways indicating the proper adjustment of the device to meet the requirements of the motor, for use.

3. A gas regulator for motor propelled vehicles, as characterized in claim 1, including a manually operable member connected with and for adjusting said indicator.

4. A gas regulator for motor propelled vehicles, including a circular dial and a central portion of semi-spherical form, integrally formed therewith, arcuate slots being provided diametrically operated points between said dial and semi-spherical portions, an operating member pivotally held centrally of said dial, and an indicator movably connected with said operating member and having portions extending through said slots and movably disposed over the face of said dial, for the purpose described.

5. A gas regulator for motor vehicles, as characterized in claim 4, including in combination, a carbureter having a valve therein for regulating the flow of fuel to the motor and means for operably connecting said regulator with said valve.

6. A gas regulator for motor vehicles, including a circular dial adapted to be attached to the instrument board of a vehicle, a semi-spherical portion integrally formed therewith, centrally of said dial, arcuate slots being provided at diametrically opposite points between said diametric portion and said spherical portion, an operating portion situated in the center of said spherical portion, an indicator member operably connected with said member and having the figure of an automobile on one end thereof protruding through one of said slots and a pointer on the opposite end thereof protruding through the other slot, said dial and said central portion having indicia thereon for visibly indicating the extent of movement of said indicator to meet the requirements of use.

BERNHARD G. CARLSSON.

Witnesses:
 LUTHER L. MACK,
 J. W. SHEELEY.